United States Patent [19]

Huisveld, Jr. et al.

[11] 4,198,703
[45] Apr. 15, 1980

[54] SUBMARINE SIMULATING SONAR BEACON

[75] Inventors: Peter Huisveld, Jr., National City; Milton D. Papineau; Claude C. Routh, both of San Diego, all of Calif.

[73] Assignee: The United States of America as represented by the Secretary of the Navy, Washington, D.C.

[21] Appl. No.: 28,810

[22] Filed: May 12, 1960

[51] Int. Cl.² .............................................. H04K 3/00
[52] U.S. Cl. .............................................. 367/1; 35/10.4
[58] Field of Search ................. 340/2, 5, 5 D; 114/20; 35/10.4, 25; 343/18

[56] References Cited

U.S. PATENT DOCUMENTS

| | | | |
|---|---|---|---|
| 1,803,530 | 5/1931 | King et al. | 114/20 |
| 2,887,671 | 5/1959 | Frankel et al. | 340/2 |
| 2,938,483 | 5/1960 | Mason | 340/5 D X |
| 2,975,396 | 3/1961 | Mueller | 340/5 D X |

FOREIGN PATENT DOCUMENTS 586452 11/1959 Canada ..................................... 35/10.4

*Primary Examiner*—Richard A. Farley
*Attorney, Agent, or Firm*—Paul N. Critchlow

EXEMPLARY CLAIM

1. In a submarine simulation sonar beacon adapted for predetermined maneuvering under water, a hull having a forward and an aft transducer for receiving an acoustical signal within said water, means disposed in said hull connected to said forward and aft transducers for comparing the time relationship of arrival of said acoustical signal thereat, means coupled to said comparing means for generating an output signal having a characteristic which is a function of said time relationship, means coupled to said generating means for amplitude and highlight modulation of said output signal, and transmitting transducer means mounted on said hull and coupled to said last mentioned means for broadcasting said modulated signal through said water.

11 Claims, 13 Drawing Figures

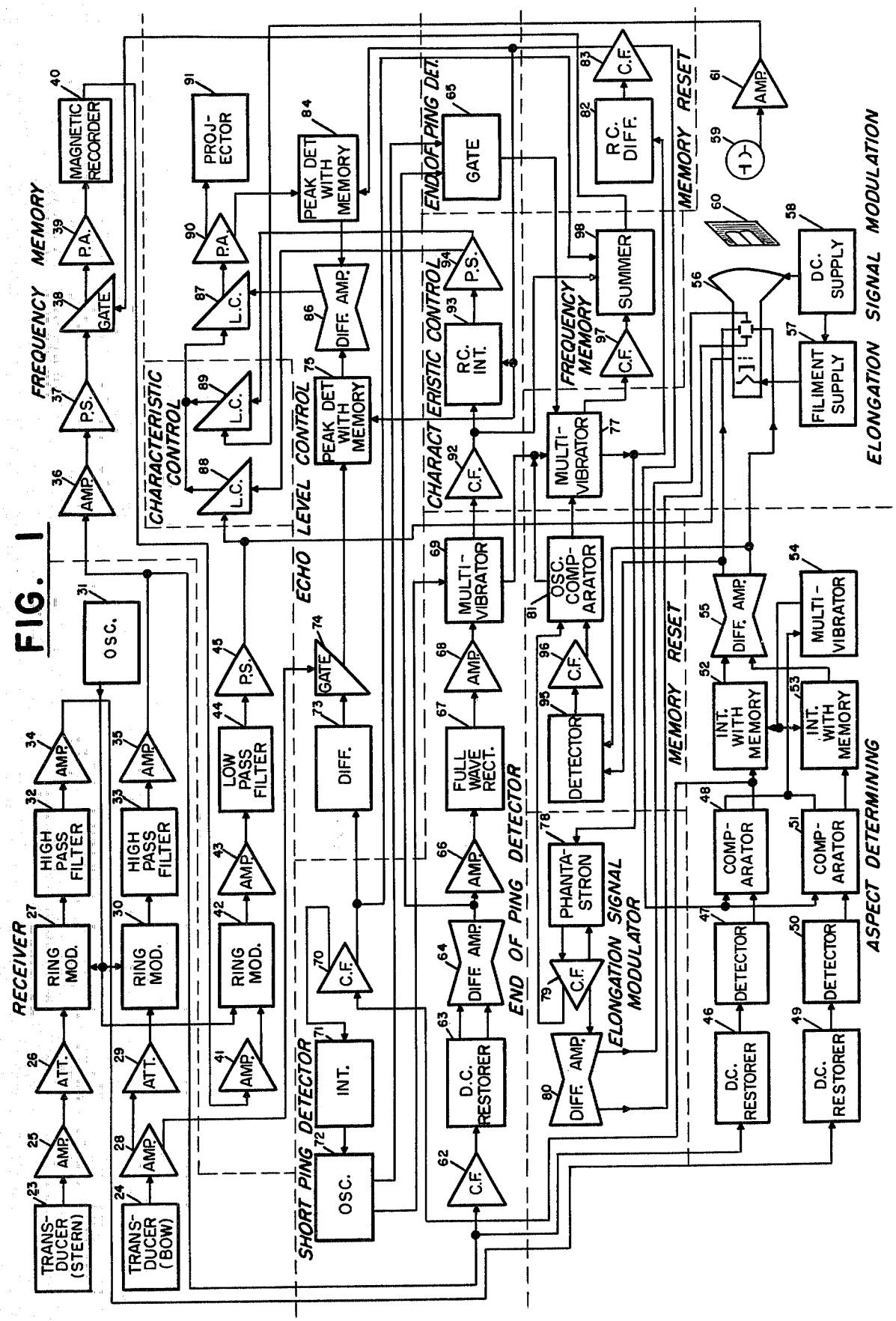

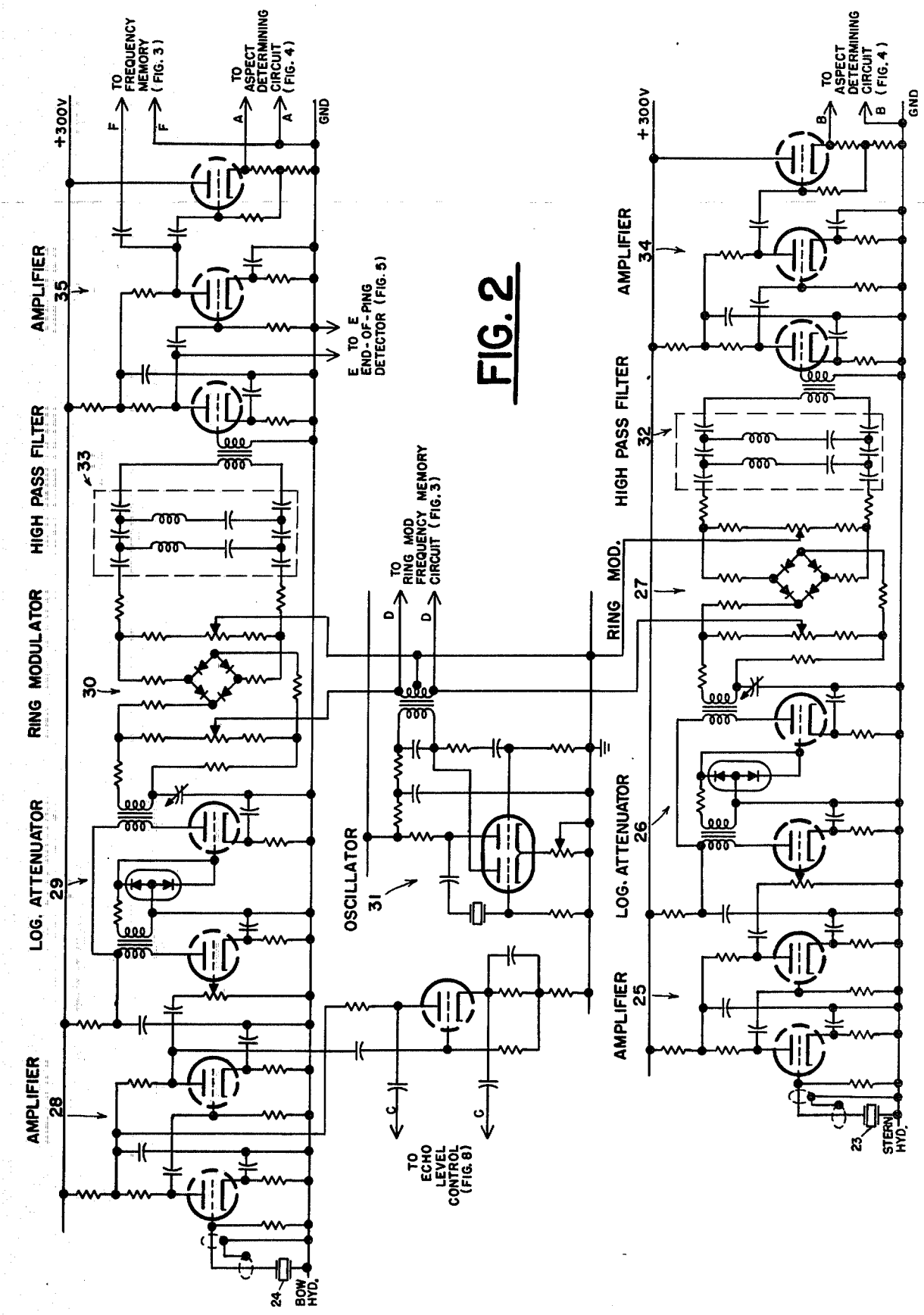

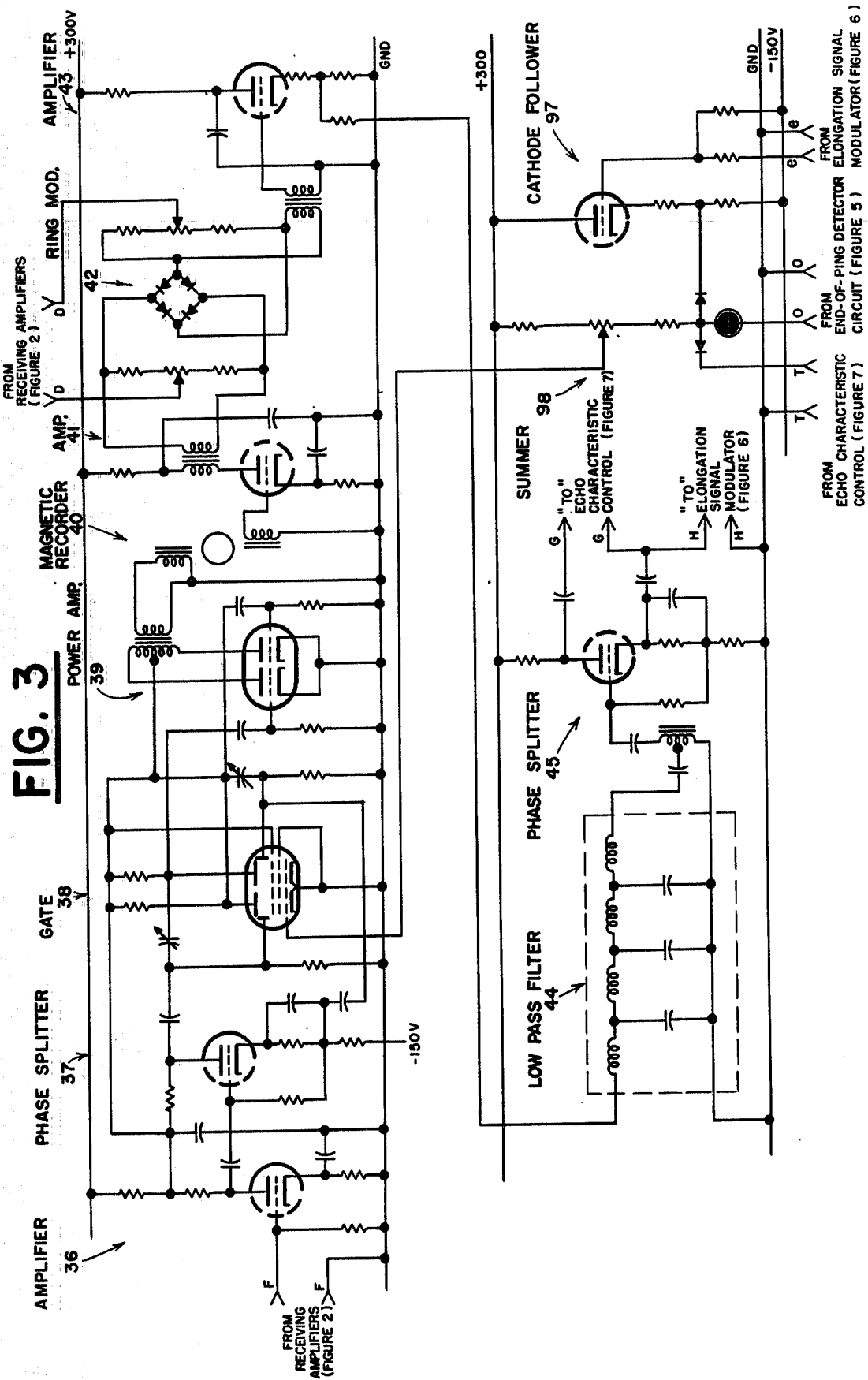

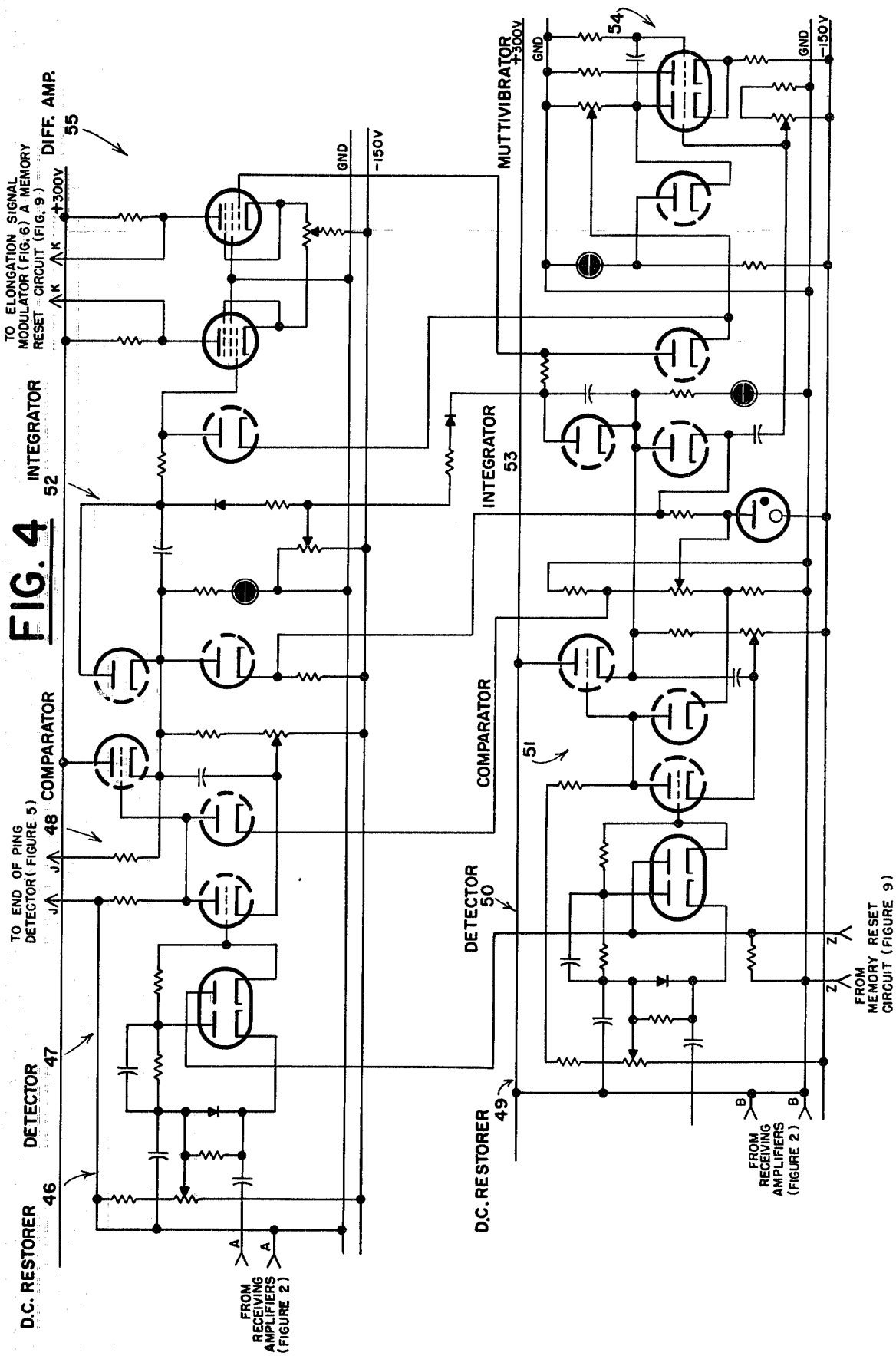

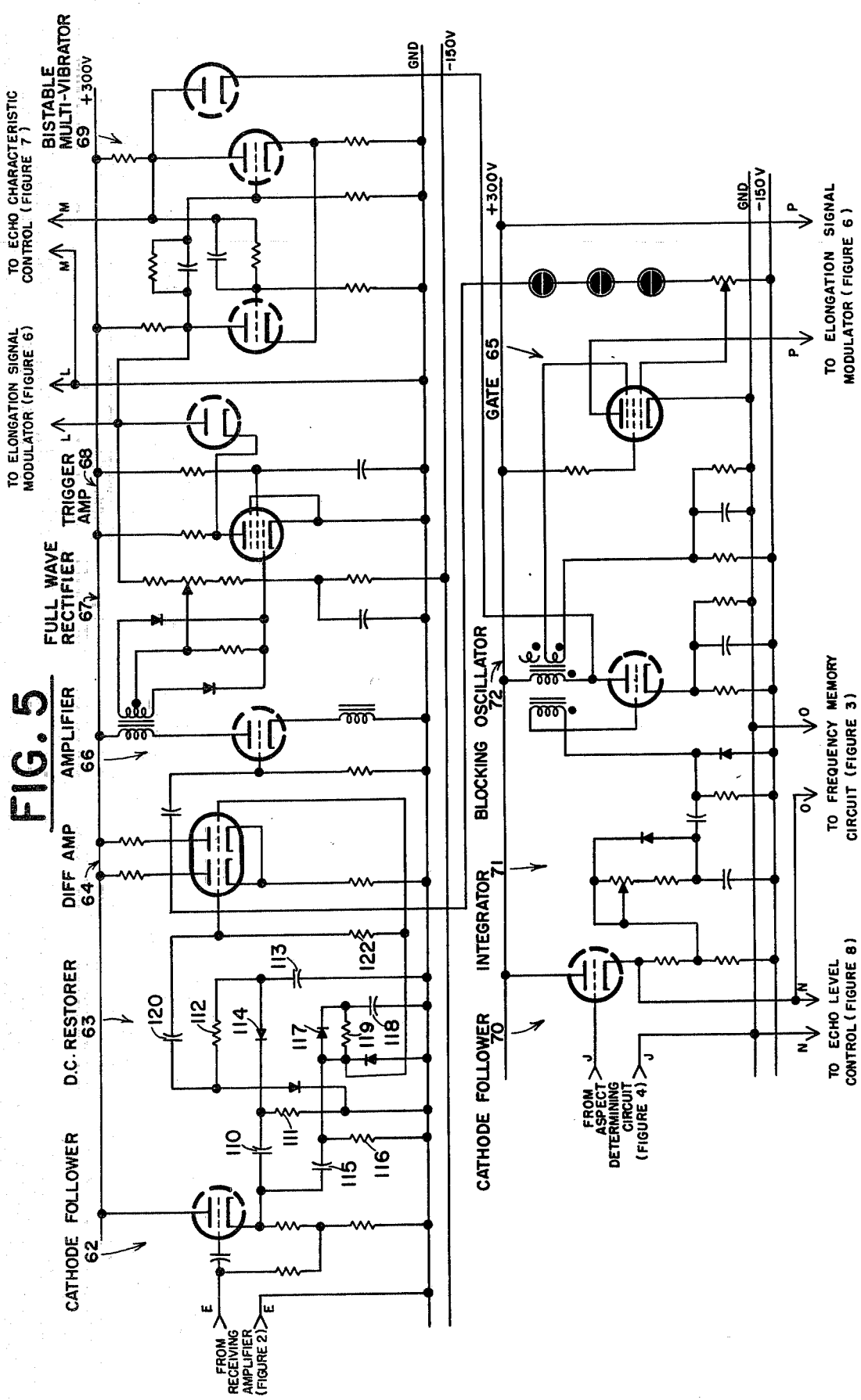

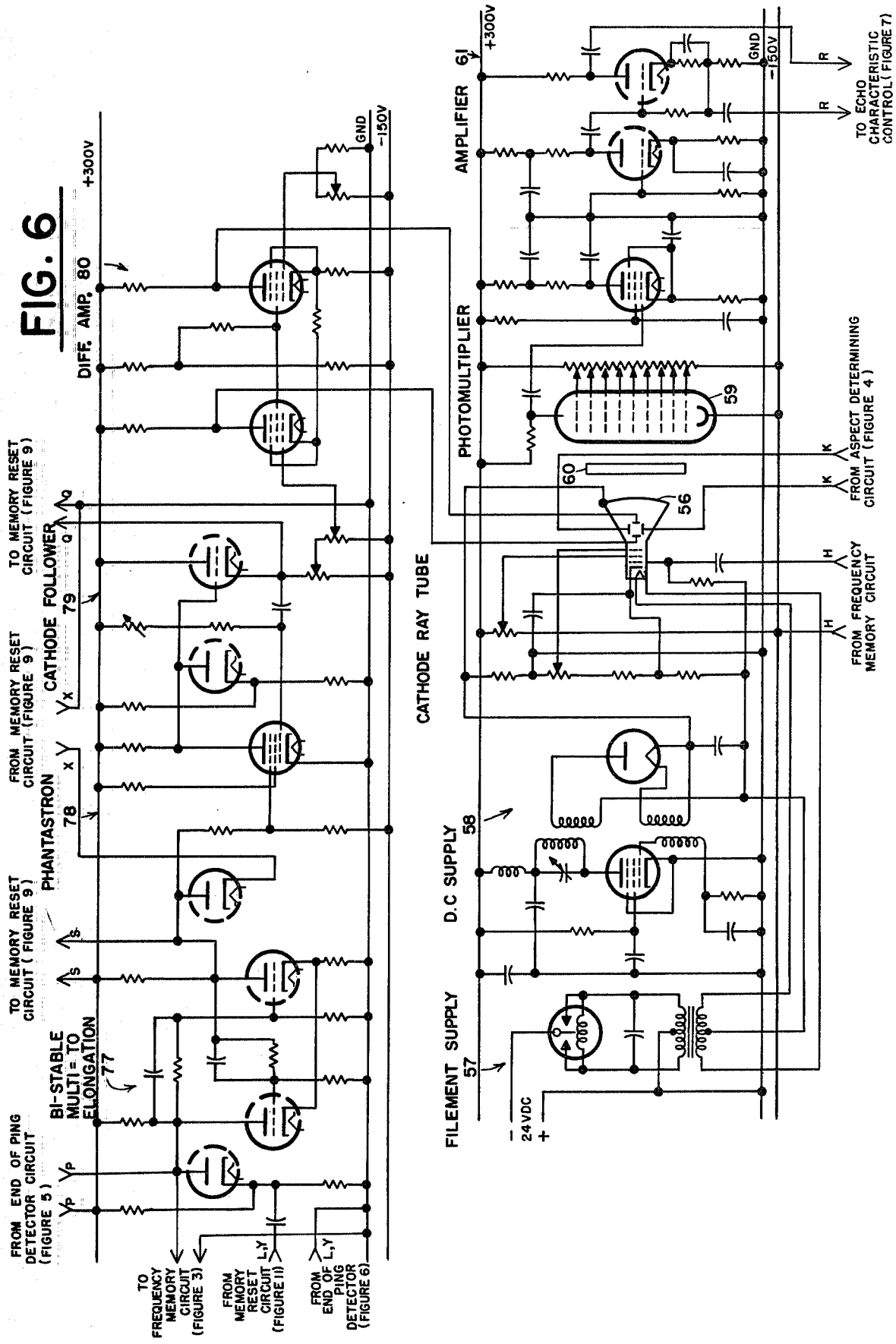

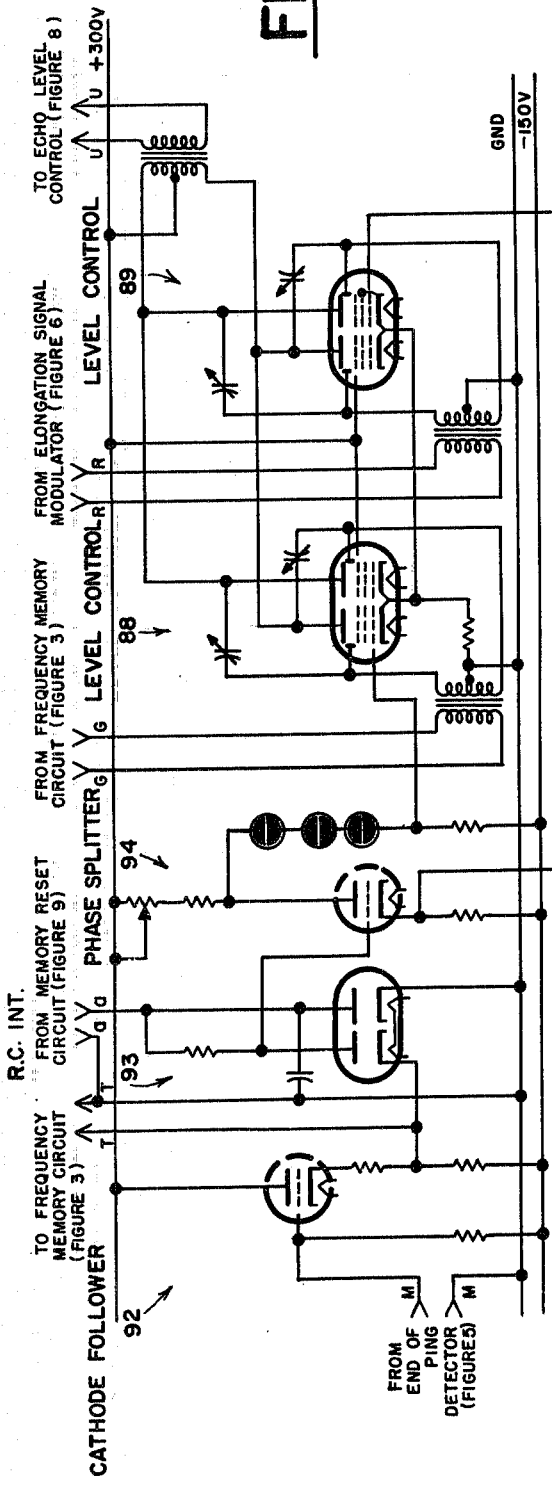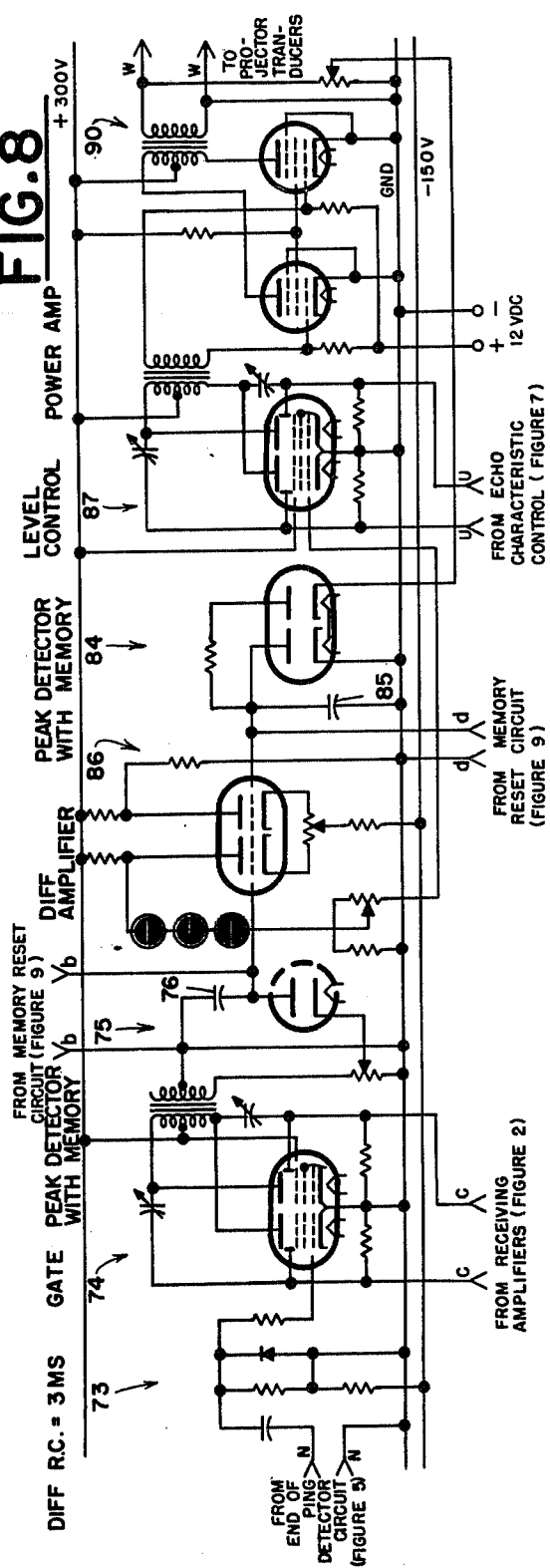

SUBMARINE SIMULATING SONAR BEACON

The invention described herein may be manufactured and used by or for the Government of the United States of America for governmental purposes without the payment of any royalties thereon or therefor.

This invention relates generally to submarine boat simulating decoys and in particular to a sonar system for receiving the acoustical search pulse of an adverse or other vehicle and converting it into an elongated signal corresponding to the pulse that would be reflected from an actual maneuvering submarine boat and broadcasting said elongated signal back to said vehicle for deception and decoy purposes.

In order to facilitate the training of sonar operators or the deception of an enemy conducting underwater warfare, it is often desirable and sometimes necessary to employ submarine vehicles that simulate the characteristics of actual submarine boats of the combat type in lieu of using real submarine boats themselves. So doing not only substitutes a lesser expensive and more portable device for a real submarine boat needed for other tasks in the former instance but makes use of a more expendable device as a decoy means, whereby life and more valuable property may be saved in the latter case.

Devices of the prior art, while being useful for many suitable purposes, do not appear to have sufficient sophistication to provide optimum operational flexibility. Moreover, their acoustic simulation is substantially fixed, and they do not include means for producing an echo with elongation and highlights representing the acoustic signatures of actual submarines.

The submarine simulating beacon constituting the present invention is a considerable improvement over the prior art devices in that it is capable of maneuvering in course, depth, and speed while appropriate changes are simultaneously made in acoustic simulation to match or correspond to said maneuvering. In general, this is accomplished by receiving the echo-ranging search ping or CW signal from an enemy or other vessel and converting it through elongation processes, intensity controls, and highlight modulations into a signal which is broadcast back to said vessel as an echo representing a full-sized submarine having an aspect, as viewed by said vessel, in accordance with the maneuvering of the subject beacon. The term "aspect" mentioned above and subsequently used herein is defined as the angle between the longitudinal axis of the beacon as it appears to the echo ranging vessel with respect to the propagation direction of the search ping as it travels between the sound source and the beacon. It corresponds essentially to the relative bearing or angle on the bow of the echo-ranging vessel as viewed by the beacon, and is of considerable importance in effecting deceptive maneuvering characteristics thereof. Thus, this invention provides a means that is able to appear as a real combat submarine boat to sophisticated sonar equipment and expert sonar operator teams for either training or target decoy purposes.

It is, therefore, an object of this invention to provide an improved self-propelled submarine simulating decoy.

Another object of this invention is to provide a mobile sonar beacon having acoustic characteristics of a combat submarine boat.

A further object of this invention is to provide a relatively small mobile sonar beacon adapted for having programmed maneuvering characteristics of a submarine boat and acoustic and wake simulation characteristics which correspond to said maneuvering characteristics.

Another object of this invention is to provide a mobile sonar beacon having improved range resolution characteristics.

Another object of this invention is to provide an echo elongation system which may be employed by a submarine vehicle to deceive an adverse vessel with respect to its actual size, shape, course, aspect, bearing, and perhaps national origin by broadcast or acoustical presentation of a physical characteristic signature other than that which normally exists.

Still another object of this invention is to provide a maneuverable sonar beacon having controllable echo elongation capabilities.

Another object of this invention is to provide a sonar beacon having controllable highlight and signal strength capabilities.

A further object of this invention is to provide a mobile, unmanned training device for effectively and economically training sonar operators.

Another object of this invention is to provide a submarine decoy means that will satisfactorily act as a target for active or passive acoustic homing torpedoes.

Another object of this invention is to provide a relatively small, mobile submarine simulator that can receive a search sonar signal from an adverse vessel and broadcast a return signal, which in amplitude, frequency and duration, is characteristic of a reflected echo signal from a full-sized submarine boat.

A further object of this invention is to provide an improved sonar system having projector directivity patterns which create the same effect that target aspect has on target strength.

Another object of this invention is to provide an improved sonar system capable of receiving an underwater acoustic signal and transmitting same at a level controlled by the received signal level.

Other objects and many of the attendant advantages of this invention will be readily appreciated as the same becomes better understood by reference to the following detailed description when considered in connection with the accompanying drawings in which like reference numerals designate like elements throughout the figures thereof and wherein:

FIG. 1 is a block diagram of a preferred embodiment of the submarine echo simulation circuitry;

FIG. 2 is a detailed exemplary schematic diagram of the hydrophone, receiving amplifier, and oscillator portions of the subject invention;

FIG. 3 is a detailed exemplary schematic diagram of that portion of the invention constituting the frequency memory circuit;

FIG. 4 is a detailed exemplary schematic diagram of that portion of the invention constituting the aspect determining circuit;

FIG. 5 is a detailed exemplary schematic diagram of that portion of the invention constituting the end of ping detector circuit;

FIG. 6 is a detailed exemplary schematic diagram of that portion of the invention constituting the elongation signal modulator circuit;

FIG. 7 is a detailed exemplary schematic diagram of that portion of the invention constituting the echo characteristics control circuit;

FIG. 8 is a detailed exemplary schematic diagram of that portion of the invention constituting the echo level control circuit;

Figure 9:
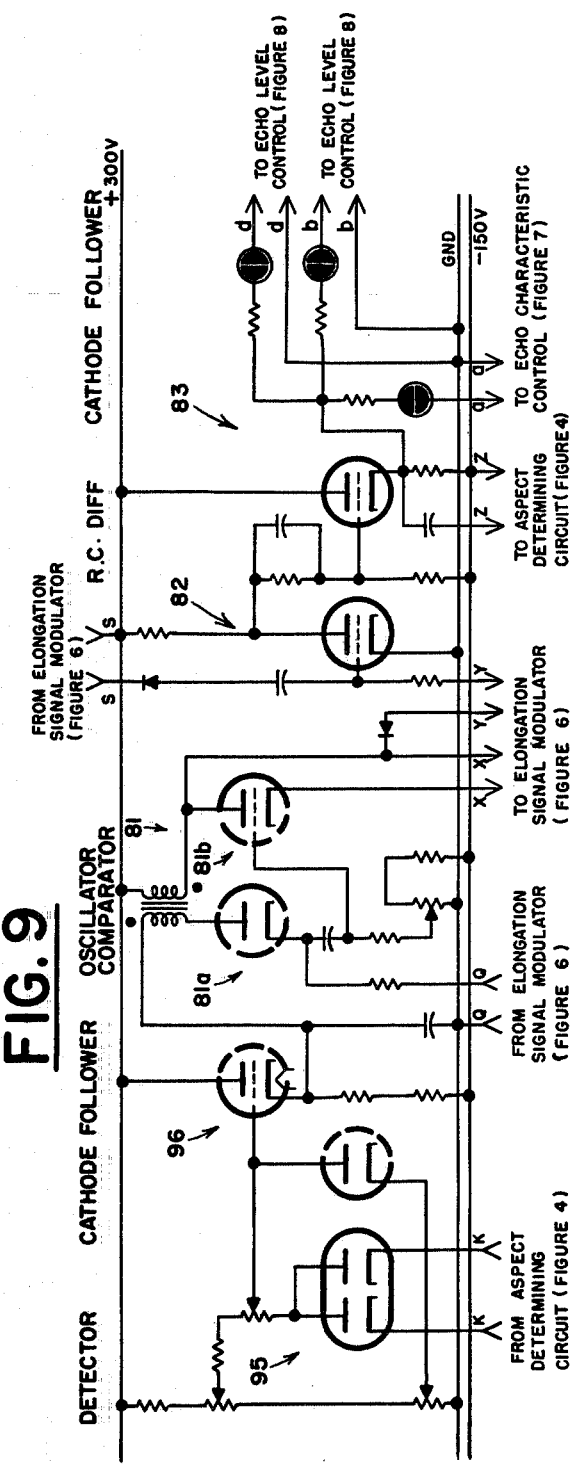
FIG. 9 is a detailed exemplary schematic diagram of that portion of the invention constituting the memory reset circuit.

Referring now to the drawings, there is shown in FIGS. 1 through 10 a pair of substantially omnidirectional stern and bow transducers 23 and 24 of any appropriate type for converting an incoming energy signal into a proportional electrical signal and vice versa.

Transducer 23 has its electrical output signal amplified by a fairly flat response bandpass amplifier 25, after which it is waveshaped by a diode type logarithmic attenuator 26 and fed to one of the inputs of a ring modulator 27. Likewise, transducer 24 has its output amplified by a fairly flat response bandpass amplifier 28, after which it is waveshaped by another diode type logarithmic attenuator 29 and applied to one of the inputs of ring modulator 30. An oscillator 31 is connected to the other inputs of ring modulators 27 and 30 for heterodyning purposes. The outputs of ring modulators 27 and 30 are respectively filtered and amplified by high pass filters 32 and 33 and amplifiers 34 and 35 in preparation for being applied to the frequency memory circuit and the aspect determining circuit.

The output from amplifier 35 is reamplified in an amplifier 36 and fed to a phase splitter 37, from which it is gated by a gate 38 and further amplified by power amplifier 39, and then applied to a magnetic recorder 40 for timely storage therein. The output from magnetic recorder 40 is fed through an amplifier 41 to one of the inputs of a ring modulator 42 where it is heterodyned with the output of said oscillator 31. The output of ring modulator 42 is coupled through an amplifier 43, a low pass filter 44, a phase inverter or splitter 45 to the inputs of the echo characteristic control and the elongation signal modulator circuits defined in detail below.

The outputs of amplifiers 34 and 35 of the receiving amplifier and oscillator circuit are also applied respectively to two substantially identical channels within the aspect determining circuit. Amplifier 35 is connected to a negative DC restorer 46 for voltage leveling purposes, after which the output therefrom is detected in a negative detector 47 and applied as one input to a bow comparator 48 having a pair of outputs. Likewise, the output of amplifier 34 is connected to a negative DC restorer 49 for voltage leveling purposes, after which the output therefrom is detected in a negative detector 50 and applied at one input to a comparator 51 also having a pair of outputs. One of said pair of outputs from each of said comparators 48 and 51 are respectively fed to one of the inputs of 2 millisecond RC integrator and memory circuits 52 and 53. The other of said pair of outputs from comparators 48 and 51 are electrically coupled together and applied to a 1.26 millisecond monostable multivibrator 54, the output of which is fed to the other inputs of said RC integrator and memory circuits 52 and 53 simultaneously. The outputs of RC integrator and memory circuits 52 and 53 are fed as a pair of inputs to a differential amplifier 55 which, in turn, provides a pair of outputs connected to the memory reset circuit and the vertical positioning means of a cathode ray tube 56 in the elongation signal modulator circuit.

The signal elongation modulator circuit consists of the aforementioned cathode ray tube which has a fast phosphor screen and is appropriately energized by filament voltage supply 57 and a five thousand volt DC supply 58 interconnecting the cathode ray tube and the filament supply. The grid of said cathode ray tube is connected to receive the output signal from the aforementioned phase splitter 45 in the frequency memory circuit. Placed in front of the viewing screen of said cathode ray tube is a fast acting photomultiplier tube 59 with a varying density and light transmission mask 60 interposed therebetween. The output of photomultiplier tube 59 is amplified by an amplifier 61 before being fed to the echo characteristic control circuit.

The output of amplifier 35 of the receiving amplifier and oscillator circuit is also connected to an input circuit isolation cathode follower 62 of the end of ping detector circuit. The output from the aforesaid cathode follower 62 is fed to a positive and negative DC restorer 63 and on as two inputs to a differential amplifier 64, one output of which is coupled as a gating pulse constituting one input to a trigger gate 65 for ping length less than 3 milliseconds, and the other output of which is amplified by amplifier 66, full wave rectified by rectifier 67, and amplified and inverted by a trigger amplifier 68, before triggering a bistable multivibrator 69 for controlling the echo elongation.

The output of comparator 48 is also applied to an input cathode follower 70 of the short ping detector circuit. One of the outputs of said cathode follower is connected through a 3 millisecond RC integrator 71 to a blocking oscillator 72 having a pair of outputs, one of which is coupled to trigger gate 65, the other of which is fed to one of the inputs of bistable multivibrator 69.

Cathode follower 70 also has an output connected to the echo level control and frequency memory circuits. The input to the echo level control circuit includes a 3 millisecond RC differentiator 73, the output of which controls a gate 74, gating the output of amplifier 28 which is the amplified bow-hydrophone output signal. This gated signal is peak detected by a peak detector 75 with memory 76.

The output of bistable multivibrator 69 is fed to the elongation signal modulator circuit and is applied to one of the inputs of a bistable multivibrator 77, one of the outputs of which is connected through a phantastron 78, a cathode follower 79 with feedback to said phantastron, to a differential amplifier 80 having a pair of outputs, each of which is respectively connected to the horizontal deflection means of cathode ray tube 56. Another output from cathode follower 79 is coupled as one of the inputs to a blocking oscillator comparator 81, the output of which is returned as an input to bistable multivibrator 77. Said one output from bistable multivibrator 77 is also coupled through a 1 millisecond RC differentiator 82 and a cathode follower 83 in the memory reset circuit to comparators 48 and 51 and to peak detectors 75 and 84 for timely discharged of their respective memory elements.

The outputs of both said peak detectors with memory are coupled to a differential amplifier 86, the output of which is coupled as one of the inputs of level control 87. The other input of level control 87 is obtained from the combined outputs from a pair of level controls 88 and 89 in the echo characteristic control. The output of level control 87 is amplified by a power amplifier 90 and fed back to peak detector 84 and on to one or more transducers or acoustical projectors 91 having appropriate radiation patterns.

The output of phase splitter 45 of the frequency memory circuit is coupled to the echo characteristics control circuit. Thus, level control 88 has its input connected to the output of phase splitter 45 for response thereto. The echo characteristic control circuit also includes a cathode follower 92 that is connected for response to one of the outputs of bistable multivibrator 69 of the end of ping detector circuit. One output of cathode follower 92 is coupled to one of the inputs of a 60 millisecond integrator 93, the output of which is inverted in a phase splitter 94 and fed as a pair input signals to level controls 88 and 89, respectively. Level control 89 has one of its inputs connected to the output of amplifier 61 for response to the amplified output signal of photomultiplier 59 of the elongation signal modulator circuit.

The pair of outputs from differential amplifier 55 of the aspect determining circuit, as well as being fed to cathode ray tube 56 of the elongation signal modulator, are applied as a pair of inputs to a negative level detector 95, the output of which is fed through a circuit isolation cathode follower 96 to one of the inputs of said blocking oscillator comparator 81. Of course, as mentioned previously, the output of blocking oscillator comparator 81 supplies one or more of the signal inputs to appropriately actuate bistable multivibrator 77. For similar reasons, the output of trigger gate 65 is coupled to multivibrator 77 to provide one of the appropriate actuating signals therefor.

The other of the outputs from multivibrator 77 is coupled through a cathode follower 97 to an algebraic summer 98 which, moreover, has an additional pair of inputs, one from the output cathode follower 70 of the short ping detector circuit portion of the end of ping detector circuit and the other from the output of cathode follower 92 of the echo characteristic control circuit. The output of summer 98 is fed to one of the inputs of gate 38 of the frequency memory circuit.

Bow comparator 48 and stern comparator 51 of the aspect determining circuit simultaneously receive as one of their inputs the output from cathode follower 83 of the memory reset circuit. Also, the output of phase splitter 45 of the frequency memory circuit is simultaneously applied as an input to both level control 88 of the echo characteristic control circuit and the control grid of cathode ray tube 56 of the elongation signal modulator.

Referring now to FIGS. 2 through 12 there is shown the components of the blocks of FIG. 1 in a more detailed form. As will be readily evident to the artisan, most of the stages constituting said components are already known and conventional in themselves alone. Accordingly, although schematically depicted in considerable detail, it is deemed unnecessary to verbally define and discuss each individual element per se. Rather, this discussion will be confined to the more general stage aspects, inasmuch as it is the interconnection and interaction of said stages which effect the unique system constituting this invention. Of course, when said stages are not conventional in themselves, they are discussed and referenced by appropriate numeral in order to insure completeness of disclosure and to facilitate understanding thereof.

The search ping or CW signal in the five to one hundred kilocycle per second band originating at an adverse vessel during combat or training echo-ranging equipment during the instruction and training of sonar operators is received by hydrophones mounted at rear and front locations on the hull of the beacon.

As specifically shown in FIG. 2, each ping or incoming signal is respectively converted into proportional electrical signals by stern and bow hydrophones 23 and 24, said electrical signals serving as a pair of inputs to the receiver circuit. In said receiver circuit, they are amplified respectively by amplifiers 25 and 28, shaped by logarithmic attenuators 26 and 29, and heterodyned by ring modulators 27 and 30 to the 110 and 205 kilocycle per second band. Common 105 kilocycle per second oscillator 31 drives said ring modulators for both receiving channels. The resulting signal in each channel is respectively filtered by high pass filters 32 and 33 and amplified by amplifiers 34 and 35 for subsequent use in driving the aspect determining circuit, the only circuit, incidentally, requiring a signal from both receiver channels, inasmuch as all other circuits are fed by the signal from the bow hydrophone channel only.

If the receiver circuit of FIG. 2 is considered as a unitary portion of the entire system constituting this invention, it should be noted that its only intelligence signal inputs are those received from the hydrophones. However, because it interacts with a plurality of other circuits which may for disclosure purposes be also considered as circuit units, it should be noted that a plurality of output signals are supplied therefrom to said other circuits. Although from time to time these unitary circuits will be mentioned in connection with the circuit unit being explained, due to the complexity of the subject invention, detail discussions thereof will be deferred to subsequent times that facilitate their disclosures in a more appropriate order. The outputs referred to with respect to the present receiving circuit are obtained at: AA from amplifier 35 and fed to D. C. restorer 46 of the aspect determining circuit (FIG. 4), BB from amplifier 34 and fed to DC restorer 49 of the aspect determining circuit (FIG. 4), CC from one of triodes of amplifier 28 and fed to gate 74 of the echo level control circuit (FIG. 8), DD from oscillator 31 and fed to ring modulator 42 of the frequency memory circuit (FIG. 3), EE from amplifier 35 and fed to cathode follower 62 of the end of ping detector circuit (FIG. 5), and at FF from amplifier 35 and fed to cathode follower 36 of the frequency memory circuit (FIG. 3).

Referring now to FIG. 3, the signal from FF of the bow hydrophone channel of the receiver circuit (FIG. 2) is applied to the frequency memory circuit where it is amplified by amplifier 36, inverted by phase splitter 37, gated by gate 38, and recorded to saturation for subsequent playback in a ferric oxide-coated drum type magnetic memory recorder 40, capable of storing a three millisecond ping signal in one revolution of the drum. Of course, recording to saturation effects complete errasure of previously recorded signals. To prevent the beacon from receiving its own transmission via water return and thereby causing the magnetic recording to degenerate, the signal is gated off after the first three milliseconds of reception by a signal from summer 98 (FIG. 3), which just allows it to fill the recording disc.

In passing, it is noteworthy that a three millisecond delay before the transmitted signal arrives at the receiving hydrophone may be accomplished by spacing the projector at a distance from said such hydrophone (approximately six feet), such that the sound travel time therebetween is 1.3 milliseconds, and adding thereto a 1.7 millisecond delay obtained by proper spacing between the recording head and the playback head in the magnetic recorder. The output signal from said recorder is then amplified by amplifier 41 and heterodyned in ring modulator 42 with the 105 KC signal from the aforesaid oscillator 31, reamplified by amplifier 43, filtered by low pass filter 44, and phased by phase splitter 45 in order to obtain the original frequency of the incoming ping received by the hydrophones.

To effect proper gating of gate 38 by the output of summer 98, a plurality of inputs are supplied to said summer. These are: QQ fed to cathode follower 97 from multivibrator 77 of the elongation signal modulator (FIG. 6) which, in turn, provides one of the summer inputs; OO from cathode follower 70 of the end of ping detector circuit (FIG. 5); and TT from cathode follower 92 of the echo characteristics control circuit (FIG. 7). Of course, ring modulator 42 obtains its 105 KC heterodyning signal from local oscillator 31 of the receiver amplifier (FIG. 2).

Hence, it can be seen that in order to have a continuous and readily available reference to the frequency of the incoming ping or CW signal for subsequent use and processing, it is effectively recorded in the subject frequency memory circuit, which, in turn, timely provides signal outputs GG and HH from phase splitter 45 to level control 88 of the echo-characteristics control circuit (FIG. 7) and to the control grid of cathode ray tube 59 of the elongation signal modulator circuit (FIG. 6) for intensity modulation thereof in accordance with said ping or CW signal frequency, respectively.

The direction of an arriving ping must be ascertained so that the subject beacon can present the proper echo elongation-versus-aspect angle during echo transmission. The aspect angle is translated by the aspect determining circuit of FIG. 4 into a Y-axis deflection voltage which is applied to the cathode ray tube of the elongation signal modulator of FIG. 6. The beacon is concerned only with the angle-on-the-bow angles or angles between the path of the incoming pings and the longitudinal axis of the beacon, and determination of whether said pings are arriving from the port or starboard is not necessary. Because the ping arrival delay time between hydrophones varies as the cosine of the aspect angle, this delay is utilized in determining the relative bearing of the ping source by turning time into proportional voltage.

Figure 11:
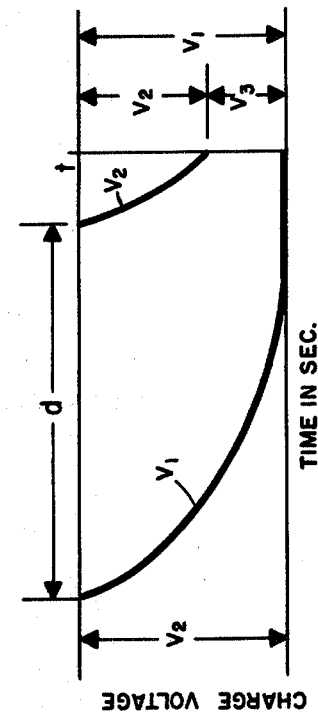
FIG. 11 is a graph of exemplary charge voltages on the memory capacitors of the aspect determining circuit after the reception of a ping or CW signal by the respective hydrophones.

The aspect determining circuit of FIG. 4 contains two substantially identical channels, one for each receiving hydrophone. The AA and BB signals from the receiving amplifier circuit section are respectively applied to negative restorers 46 and 49 where they are processed to a predetermined datum voltage range, detected by detectors 47 and 50 to provide DC negative envelopes for triggering two-way comparators 48 and 51 which, in turn, generate voltage steps. In order to reduce anticipated noise signals, the comparators' trigger level should be set well above the average noise level, and upon being triggered by the detected signals, the comparators remain in the triggered condition until the end of the elongation period, after which they are reset. The comparator which is activated first by the incoming signal effectively triggers monostable multivibrator 54 with a period of 1.3 milliseconds, the sound travel time between hydrophones. The memory capacitor of the RC integrator circuit connected to the triggering comparator receives a full negative charge for 1.3 milliseconds. The memory capacitors of the integrator circuit of the other comparator charges negatively for 1.3 milliseconds minus the length of the signal delay between hydrophones. The net negative charge difference between the two memories of integrators 52 and 53 varies in an exponential manner to compensate for the cosine function of the delay between hydrophones due to the aspect or angle-on-the-bow. FIG. 11 illustrates the respective negative charge voltages on the memory capacitors of integrators 52 and 53 and their relation to reception time of the incoming ping at the hydrophones. However, inasmuch as the aspect angle of ping reception is a cosine function which is not linear, it was determined that increased accuracy could be obtained by compensating said cosine function with the nonlinear exponential time function of charging capacitors. Thus, ping reception delay time between hydrophones is compensated to become a substantially linear function which is proportional to relative bearing when expressed by the light beam of the cathode ray tube.

This compensation may be mathematically defined by the following derivation:

Letting:

$V_t$ = total charge voltage $V_1$ = charge voltage effected by first hydrophone to receive the ping $V_2$ = charge voltage effected by second hydrophone to receive the ping Letting:

d = delay time between hydrophones due to aspect or angle-on-the-bow e = the transcendental number used as the base of the system of natural logarithms and equals 2.71828 approximately t = charge time r = resistance in ohms of the resistor of the RC integrator c = capacitance in farads of the capacitor of the RC integrator Then:

$V_3 = V_1 - V_2$ $$V_1 = V_t \left[ 1 - e^{\left(\frac{-t}{RC}\right)} \right]$$

$$V_1 = V_t \left[ 1 - \frac{1}{e^{\left(\frac{t}{RC}\right)}} \right]$$

$$V_2 = V_t \left[ 1 - e^{\left(\frac{-t-d}{RC}\right)} \right]$$

$$V_2 = V_t \left[ 1 - e^{\left(\frac{d-t}{RC}\right)} \right]$$

$$V_2 = V_t \left[ 1 - \frac{e^{\left(\frac{d}{RC}\right)}}{e^{\left(\frac{t}{RC}\right)}} \right]$$

-continued $$V_3 = V_t \left[ 1 - \frac{1}{e^{\left(\frac{t}{RC}\right)}} \right] - V_t \left[ 1 - \frac{e^{\left(\frac{d}{RC}\right)}}{e^{\left(\frac{t}{RC}\right)}} \right]$$

$$\frac{V_3}{V_t} = -\frac{1}{e^{\left(\frac{t}{RC}\right)}} + \frac{e^{\left(\frac{d}{RC}\right)}}{e^{\left(\frac{t}{RC}\right)}}$$

$$\frac{V_3}{V_t} = \frac{e^{\left(\frac{d}{RC}\right)} - 1}{e^{\left(\frac{t}{RC}\right)}}$$

Figure 12:
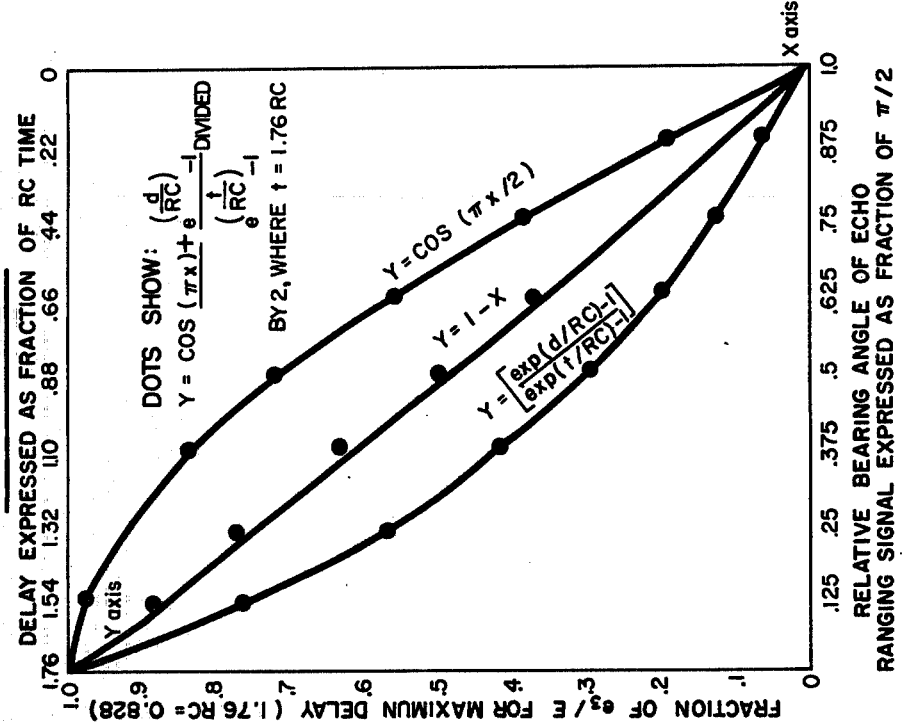
FIG. 12 is a graph of exemplary cosine and compensation curves effecting linear cathode ray tube operation for various ping aspect angles.

In order to make the ordinate values of the graph of FIG. 12 range between 0 and 1 for the compensation function as well as for the cosine function and the linear function, the compensation function is normalized by dividing the expression for $V_3/V_t$ where $d < t$ by the expression $V_3/V_t$ where $d = t$.
As $0 \leq d \leq t$ the fraction, $$\frac{\left[\frac{e^{\left(\frac{ed}{RC}\right)} - 1}{e^{\left(\frac{t}{RC}\right)}}\right]}{\left[\frac{e^{\left(\frac{t}{RC}\right)} - 1}{e^{\left(\frac{t}{RC}\right)}}\right]} = \frac{e^{\left(\frac{d}{RC}\right)} - 1}{e^{\left(\frac{t}{RC}\right)} - 1} = 0 \longrightarrow 1$$

When this value is plotted as a Y-coordinate, it takes the form of the lower, left hand curve of FIG. 12 which may be used to compensate the upper, right hand cosine function curve to produce the middle curve having a substantially linear function. FIG. 12, of course, shows the maximum compensation that is theoretical achievable in the aspect determining circuit. This compensation obviously gives a more nearly linear relationship between cathode ray tube deflection voltage and the relative bearing angle of the echo-ranging signal.

The aforementioned net charge difference between the memory capacitors is thus determined and amplified by the differential amplifier 55 and applied as input signal KK to the vertical deflection means of cathode ray tube 59, which vertically positions in a substantially linear manner the light beam therein to the mask position corresponding to the aspect, relative bearing, or angle-on-the-bow of the received ping, and to detector 95 of the memory reset circuit (FIG. 9) for initiating actuation thereof. In turn, as will be explained below, said memory reset circuit provides signals ZZ for timely de-energizing the memory capacitors of integrators 52 and 53 for reset purposes in preparation for arrival of a new incoming ping.

Upon arrival of the end of the ping received by the bow hydrophone, the cathode ray tube X-axis sweep generating means is started. It is, therefore, necessary to detect the end of the incoming ping and develop a trigger pulse at this time.

Approximately three milliseconds after the arrival of the ping wave front, the subject beacon begins to transmit on the pings frequency. This signal is also received by the hydrophones but at a lower level than the ping due to the predetermined spacial disposition and resulting acoustic isolation between the hydrophones and the projector.

The end of the incoming ping is ascertained by the end of ping detector circuit of FIG. 5 and basically is an amplitude detector followed by a peaking amplifier with a response in the middle and upper audio frequency ranges. Signal EE received from the bow hydrophone channel of the receiving amplifier circuit is transferred by the high impedance-to-low impedance circuit isolation cathode follower 62 after which it is level restored by D. C. restorer 63. This is accomplished by connecting the cathode output to the input terminal of a first capacitor 110. The output terminal of capacitor 110 is coupled to ground through a resistor 111 and also through series connected resistor 112 and capacitor 113. Connected across and in parallel with resistor 112 is a diode 114. The cathode output of cathode follower 62 is also coupled to ground through a second capacitor 115 and a resistor 116. The interconnection of capacitor 115 and resistor 116 is coupled through a diode 117 and a capacitor 118 to ground. A resistor 119 parallels diode 117. The output terminal of said capacitor 110 is also coupled through a coupling capacitor 120 to the left hand grid of the aforementioned differential amplifier 64. A diode 121 is parallel connected with resistor 116. The output terminal of capacitor 115 is also connected to the right hand grid of differential amplifier 64, and a resistor 122 interconnects the two grids of differential amplifier.

The combination DC restorer and differential amplifier circuits facilitate determining a sudden voltage level change from the receiving amplifier circuit. During the time between changes of said signal voltage, the two grids of the differential amplifier are at substantially the same potential due to the fact that they are connected together by resistor 122 and no current is flowing therethrough. But when the incoming signal level changes, the output from capacitor 110 and its associated network momentarily applies, for example, a negative potential on the left hand grid of differential amplifier 64 while simultaneously therewith the output of capacitor 115 and its associated network places a positive potential on the right hand grid of differential amplifier 64. The difference of these potentials is recognized and amplified by differential amplifier 64 and, thus, the instant the end of ping occurs, an output pulse is supplied as a trigger through amplifier 66, rectifier 67, high frequency amplifier 68 to bistable multivibrator 69 for the proper timing thereof. Likewise, the end of ping pulse from the differential amplifier is fed as a gating pulse to gate 65 for actuation of bistable multivibrator 77 of the elongation modulator circuit (FIG. 6) by the trigger from blocking oscillator 72, in order to cause said bistable multivibrator to develop a pulse having a time duration equal to the length of the elongation of the incoming ping for ultimately controlling the length of the horizontal sweep of the cathode ray tube beam. This pulse is also used for the synchronization of other components in the elongation signal modulator and memory reset circuits (FIG. 9) to be described below. Timely actuation of said gate 65 is also contingent upon reception of an appropriately timed signal from the blocking oscillator 72 which, of course, is actuated substantially three milliseconds after the instant the ping is first received at the bow hydrophone by the bow comparator output signal JJ of the aspect determining circuit through the impedance conversion and circuit isolation cathode follower 70 and the three millisecond RC integrator 71.

The subject system operates for received pings or CW signals of both less and greater duration than three milliseconds. When the ping is shorter than three milliseconds, the circuitry effectively bi-passes multivibrator 69 and actuates gate 65 instead, which, in turn, actuates multivibrator 77, instead, and starts the sweep of the light beam of the cathode ray tube at the end of three milliseconds. Otherwise, said sweep would be actuated by the end of the ping if the same occurs after three milliseconds, due to the ping being of a duration longer than three milliseconds.

Multivibrator 69 also provides a signal MM to cathode follower 92 of the echo characteristics control circuit (FIG. 7) for timely producing echo highlights. A signal NN is supplied by cathode follower 70 to differentiator 73 of the echo level control circuit (FIG. 8) for actuating echo signal strength control means therein. Another signal OO identical with signal NN is supplied to summer 98 of the frequency memory circuit (FIG. 3) to provide gating of gate 38 when the combined signals added by said summer reaches the appropriate voltage level.

Echo elongation and modulation are accomplished by means of the elongation signal modulator circuit and apparatus depicted in FIG. 6.

Outputs signals HH from phase splitter 45 are applied to the grid of cathode ray tube 56 which, in turn, causes the light beam to be intensity modulated in accordance with the incoming CW signal frequency. Due to input signal LL and PP, and XX from oscillator comparator 81 of the memory reset circuit (FIG. 9), and YY likewise from said oscillator comparator 81 of the memory reset circuit, bistable multivibrator 77 appropriately produces a pulse that is equal to the length of the horizontal sweep across the cathode ray tube by initiating the generation of a sawtooth wave within phantastion 78 which, in turn, is converted to sufficient sweep voltage for cathode ray tube actuation purposes by differential amplifier 80. Hence, the aforementioned intensity modulated light beam is swept across mask 60 every time an incoming ping occurs and is thus additionally modulated in accordance with opaque profiles and shading densities corresponding to submarine boat acoustic signatures. The amplitude modulated illumination from the cathode ray tube that is detected by photomultiplier 59, consequently, carries essentially all the required echo characteristics necessary for simulating echos reflected from full-sized submarines or other vessels as may be desired. To improve the usefullness of photomultiplier 59, the resulting output therefrom is further amplified in three stage amplifier 61 before being applied as signal RR to level control 89 of the echo characteristic control circuit (FIG. 7) subsequently described below.

In order to effect proper resetting of the aforementioned memory capacitors, the initiation, production, and end of said sawtooth voltage must be recognized and pertinent action taken accordingly so that the subject system will function for more than just one incoming ping. Signals KK and QQ from differential amplifier 55 and cathode follower 79 of the elongation signal modulator circuit (FIG. 6) respectively applied to blocking oscillator comparator 81 of the memory reset circuit illustrated in FIG. 9, initiate achieving this effect therein, as will be further discussed in the explanation of FIG. 9 below.

As is well known in the sonar art, the use of short search pings ordinarily causes an echo of fairly high resolution to be reflected from a target due to the presence of considerable highlights contained therein. And the use of long search pings effect less target resolution as a result of less highlights being present. As used in this case, highlights are defined as those wave forms present in an echo signal that represent and portray distinguishable physical characteristics and profiles of the reflecting object, which considerably facilitate the identification thereof. In order to make the subject beacon appear to be an actual submarine boat to both short and long pings as well as to pings of any length in between, it is necessary to modulate the transmitted echo to add or delete highlights accordingly. For a ping length less than about forty milliseconds, the elongation portion of a submarine echo has characteristic amplitude modulation. This modulation corresponds to the target strengths of the different reflecting areas of the submarine and occurs in time as these are insonified. As the ping length increases, the low-level return position is gradually filled in by sound from other than direct paths. For ping lengths greater than one hundred twenty milliseconds, there is little left of a submarine boat's acoustic signature in the echo, since the return is so mixed that there are practically no marked amplitude changes.

This effect is simulated electronically by mixing the stored CW signal from the magnetic recorder with the cathode ray tube mask-modulated signal in a ratio controlled by ping length. This control is obtained by permitting a pulse of duration equal to ping length less than three milliseconds to charge the capacitor in an RC circuit during the ping. The ping length duration is, of course, represented by input signal MM from multivibrator 69 of the end of ping detector circuit (FIG. 5) which is applied through cathode follower 92 to RC integrator 93 where it is stored in the capacitor thereof. Then, through phase splitter 94 this stored voltage ratio controls level controls 88 and 89, which also respectively receive said CW signal as input signal GG from the frequency memory circuit (FIG. 3) and said cathode ray tube mask modulated signal represented by input signal RR and which have their outputs mixed to provide an acoustically characterized output signal UU varied in accordance with ping length, while maintaining same at a substantially constant average voltage level. For ping lengths less than forty milliseconds, the modulated signal level is maximum and the CW signal level is minimum or cut off. For greater ping lengths, the amount of CW signal is proportionally increased and the modulated signal is proportionally decreased up to a one hundred twenty millisecond ping, where only the CW signal is used. During the arrival time of the ping, the level of the modulated signal is held to zero and only the CW signal appears in the mixer output signal UU.

Output signal TT from cathode follower 92 is applied to summer 98 of the frequency memory circuit where it is added to signals OO and QQ for effectively gating gate 38.

In addition to providing highlights representing acoustical signatures of submarines in the transmitted echo, reflected target strength must be included therein corresponding to the aspect angle of the incoming ping, in order to more completely simulate actual submarine boat acoustical characteristics. This is accomplished by the echo level control circuit of FIG. 8.

It has been found that the beacon must have an output level sufficient to produce a 25 db target strength to simulate a beam aspect target realistically. To regulate this output, a three millisecond pulse, beginning at the time the ping impinges on the bow hydrophone, is developed by applying signal NN through three millisecond RC differential 73 to gate 74 where signal CC representing the bow hydrophone signal is gated in order to sample the CW voltage level while the transmitting projector is cut off and interference due to feedback through the water is prevented. This sampled CW voltage level is peak detected in peak detector 75 to obtain the relative received amplitude, and the resulting DC voltage is stored as a charge on memory capacitor 76. Likewise, a portion of the signal to the transmitting projectors is also sampled at WW, peak detected by peak detector 84 and stored as a DC potential on memory capacitor 85. The two grids of differential amplifier 86 are controlled by said memory capacitor voltages, and any difference in their potential changes one of the plates to alter the output level in a direction to correspond more nearly to the voltage level of the received CW signal plus a set target strength. Since the process in regenerative, the adjustment reaches the control point very rapidly.

The highlighted signal UU from level controls 88 and 89 of the echo characteristics control circuit (FIG. 7) is applied to level control 87, thereby producing input signals having optimum strength and acoustical signature characteristics to the projector. Although for many purposes omnidirectional projectors may be quite satisfactory, it has been found that more realistic echo characteristics occur when a projector having a preferred radiation pattern is used to broadcast the aforementioned signals applied thereto. For example, projectors having appropriate radiation patterns may be used to distinguish among beam, bow, and stern echos, or echos in between, and thus further accent the physical disposition of the subject beacon and the submarine boat it is simulating under any given evvironmental or tactical conditions.

Signals bb and dd are applied to their respective peak detectors with memory from cathode follower 83 of the memory reset circuit shown in FIG. 9 to effect timely discharge of the memory capacitors in preparation of the next cycle of operation initiated by reception of a new ping.

In order to accomplish this, the memory reset circuit resets all capacitor memory circuits by discharging them at the end of each elongation period. This may be effected by detecting the vertical deflection voltage of the cathode ray tube, represented by input signal of the KK determining circuit (FIG. 4), in negative level detector 95 from which it is applied through circuit isolation cathode follower 96 to comparator diode 81a of blocking oscillator comparator 81, and compared therein with the horizontal sweep sawtooth voltage of said cathode ray tube, as represented by signal QQ from the elongation modulator circuit (FIG. 6) which, in turn, fires oscillator 81b of oscillator comparator 81 when said negative vertical deflection voltage and said horizontal sweep sawtooth voltage are matched, and resets elongation period bistable multivibrator 77 by means of signal XX fed thereto. A resulting negative step function from multivibrator 77, as represented by incoming signal SS, is differentiated by RC differentiator 82, clipped, amplified and inverted, and applied as a one millisecond pulse via cathode follower 83 and neon glow tube decouplers, respectively, as output signals zz, aa, bb, and dd.

Figure 10:
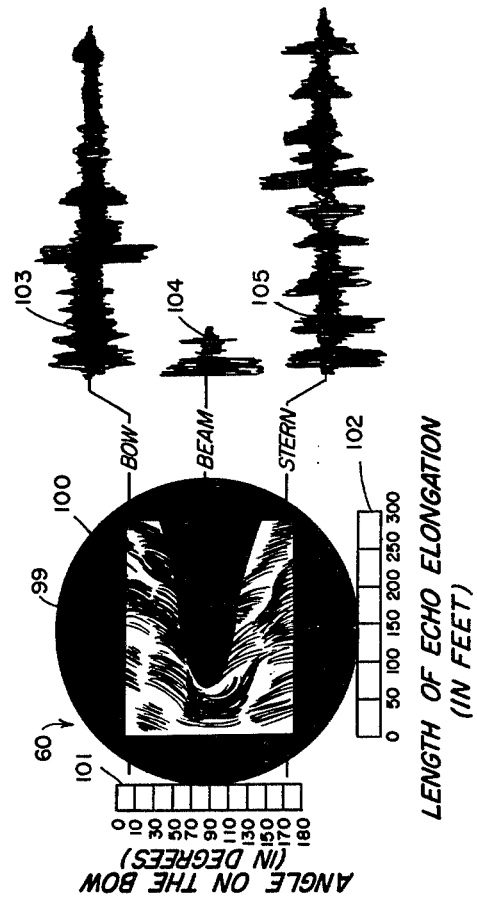
FIG. 10 is an elevational view of an exemplary echo modulation mask used in this invention.

Referring now to FIG. 10, there is shown a more detailed view of echo modulation mask 60. Essentially, it is a glass slide having an opaque portion 99 and a partially lucid portion 100 varying in light transmission capabilities from, for instance, transparent to translucent to varying degrees of opaqueness, as effected by varying densities of colloidal graphite or other substance which is substantially impervious to the type of radiant energy given forth from cathode ray tube 56.

The shape of said partially lucid portion may be on any desired predetermined configuration but preferably a side disposed u-shaped configuration, as shown, in order to provide appropriate lengths of signals or echo elongation according to aspect positions of the subject beacon with respect to any given adverse vehicle. Accordingly, the amount or intensity of the light passing through mask 60 is contingent on the position of the flying spot of the cathode ray tube which, in turn, depends on aspect or angle on bow conditions indicated by an ordinate scale 101. The amount of echo elongation is produced accordingly as indicated by an abscissa scale 102 which, in turn, simulates the length of signal that would be reflected from an actual combat submarine. The character of the echo elongated signal is, of course, determined by the shading of the partially lucid porton of the mask being use at any given time. Hence, if it is desired to reflect signals representing the acoustic signatures of different type vessels, this may be accomplished by changing masks and using a suitable one to meet the occasion. Exemplary echo elongated signals are depicted as a bow signal pattern 103, a beam signal pattern 104, and a stern signal pattern 105, and these are the signals which would be broadcast to an enemy vessel as portending sonic reflections from an actual, full-size, combat submarine of some particular type at some particular position and attitude when, in fact, only the small submarine simulating sonar beacon constituting this invention is present.

Figure 13:
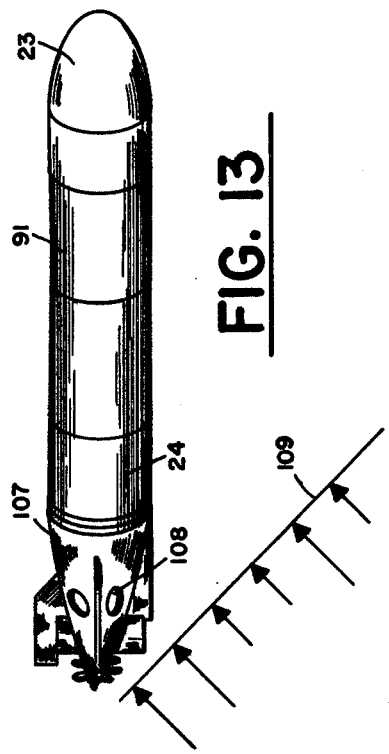
FIG. 13 is perspective view of the submarine sonar beacon constituting this invention.

Referring now to FIG. 13 of the drawings, the subject submarine simulating sonar beacon is shown as a unitary carrier device 106 having a hollow hull 107 within which appropriate power plants and programmed servomechanisms are housed for actuating propulsion and attitude control means, respectively, for driving and guiding same as desired within an aqueous environmental medium. As well as the aforementioned sonar beacon electronic system, also disposed within said hull is a wake simulation generator having an external dispensing orifice 108 for ejecting fluid or solid material therefrom during combat or training maneuvers, and when operated in conjunction with the foregoing simulation parameters, an optimum decoy action for any given tactical situation is effected.

Transducer 24 is mounted on or near the bow of the hull of the carrier vessel and transducer 23 is spacially disposed a predetermined distance in an aft direction therefrom and likewise mounted on or in said hull. Preferably, transducers 23 and 24 are of the omnidirectional type and are so mounted on the hull as to operate substantially without electrical or acoustical interference therefrom. In addition, projector 91 is likewise mounted on said hull for timely broadcasting acoustical energy without interference from the other elements of the beacon. In passing, it should be understood that the aforesaid transducers and projector may be moved or disposed in arrays as necessary to produce desired broadcast and reception patterns, omnidirectional or otherwise. Also, it should be understood that each or all of said transducers and projectors may be increased or decreased in number, interchangeably employed, and used as both receiving and transmitting components if so desired, and that so doing is well within the purview and scope of the teaching of this invention because the design changes required would be obvious to one skilled in the art.

A wavefront 108 of incoming energy, such as, for example, a sonar ping or CW signal may approach the submarine simulating sonar beacon from any direction during actual operations without adversely affecting the functions thereof.

Summarizing in general, the operation of the submarine simulating sonar beacon briefly is as follows:

Assuming, for instance, that the incoming ping or CW signal is of a duration longer than three milliseconds and that it arrives first at the bow hydrophone, it is then converted into proportional electrical signals by the hydrophones and applied to the receiver circuit for hetrodyning to a bandwidth having a reduced number of octaves to facilitate recording and to provide an increased frequency signal, in order to allow faster operation of the comparators of the aspect determining circuit. When the aspect determining circuit has determined that a ping has arrived at the bow hydrophone, it generates a step voltage which is fed through the end of ping detector circuit to the summer of the frequency memory circuit for timely gating the signal being received from the bow hydrophone channel, allowing a three millisecond sample of the received CW to be recorded in the magnetic recorder for future reference.

In the meantime, the aspect determining circuit developes a pair of stored voltages, the difference of which represents the relative bearing angle of the incoming ping. These stored voltages are then employed to actuate the vertical positioning means of the cathode ray tube so that the light beam will sweep the mask at an elevation necessary to produce signal elongation which is substantially proportional to the aspect angle of the incoming ping, as seen by the echo-ranging vessel.

The signal strength of the incoming signal is sampled and stored by the echo level control circuit and is used to control the strength of the transmitted echo signal.

After the arrival of the first three milliseconds of ping, the same unmodulated CW signal is broadcast by the projector. When the end of the incoming ping arrives, it is determined by the end of ping detector circuit which starts the horizontal sweep of the cathode ray tube essentially at that time to effect modulation of the light beam by the mask to produce highlights in the echo in accordance with the length of the incoming ping and the aspect thereof. In event, the received ping is of short duration, the echo characteristic control circuit adds considerable highlights to the echo signal to give the appearance of high resolution reflections, but if the incoming ping is of long duration, the highlighted signal and the CW signal are mixed proportionally to provide resolution of reflections similar to reflections of comparable length pings from real submarines. Thus, it is seen that the small, more expendable beacon constituting this invention simulates submarine boat acoustical characteristics in accordance with its position at any given instant during programmed or other maneuvering tactics.

In event the incoming ping or CW signal is less than three milliseconds duration, this is ascertained by the end of ping detector circuit which, in turn, starts the elongation signal modulator, thereby transmitting an echo signal containing maximum highlights.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a submarine simulating sonar beacon adapted for predetermined maneuvering under water, a hull having a forward and an aft transducer for receiving an acoustical signal within said water, means disposed in said hull connected to said forward and aft transducers for comparing the time relationship of arrival of said acoustical signal thereat, means coupled to said comparing means for generating an output signal having a characteristic which is a function of said time relationship, means coupled to said generating means for amplitude and highlight modulation of said output signal, and transmitting transducer means mounted on said hull and coupled to said last mentioned means for broadcasting said modulated signal through said water.

2. In a submarine simulating sonar beacon, an elongated hull adapted for controlled underwater maneuvering, a pair of hydrophones spacially disposed along the longitudinal axis of said hull for receiving a sonar ping, recording means mounted within said hull and connected to one of said hydrophones for timely storing the signal received thereby, means connected to each of said pair of hydrophones for comparing the sonar ping arrival time relationship thereat in terms of aspect as observed by the source of said sonar ping, means coupled to the output of said comparing means and the output of one of said hydrophones for elongating said received sonar ping in accordance with the aforesaid aspect, means effectively connected to the output of said one hydrophone for determining the length of the ping received thereby, means interconnecting said recording means, said elongating means, and said ping length determining means for mixing the outputs of said recording and elongating means in a ratio controlled by said ping length and producing an output signal proportional thereto, and a projector connected to said mixing means for response to said proportional output signal.

3. In a submarine simulating sonar beacon, a pair of spacially disposed receiving transducers, a receiver circuit having a pair of channels respectively connected for response to the outputs of said receiving transducers, a frequency memory circuit coupled to the output of one of said receiver channels, an end of ping detector circuit likewise connected to the output of said one receiver channel, an aspect determining circuit having a pair of channels respectively connected to the aforesaid pair of receiver channels for response to the outputs therefrom, an elongation signal modulator circuit connected to the outputs of said aspect determining circuit, said end of ping detector circuit, and the aforesaid frequency memory circuit, an echo characteristic control circuit interconnecting the outputs of said elongation signal modulator circuit, said end of ping detector circuit and the aforementioned frequency memory circuit, an echo level control circuit connected to the outputs of said end of ping detector circuit, said one channel of the aforesaid receiver circuit, said elongation signal modulator circuit, and said echo characteristic control circuit, and an acoustical projector coupled to the output of said echo level control circuit.

4. The device of claim 3 further characterized by a memory reset circuit interconnecting an output of said elongation signal modulator and inputs to the aspect determining circuit, the echo characteristic control circuit, and the echo level control circuit.

5. In a submarine simulating sonar beacon, means for receiving an incoming CW signal and converting same into a potential proportional to the relative bearing of the path thereof, means effectively connected to said receiving and converting means for elongating and highlighting said received CW signal in accordance with the relative bearing and duration thereof, respectively, means coupled to said receiving and converting means for regulating the amplitude level of said elongated and highlighted signal in accordance with received CW signal strength and said relative bearing potential, and means coupled to the aforesaid amplitude level regulating means for broadcasting the regulated signal therefrom in terms of proportional acoustical energy.

6. The device of claim 5 wherein said means for receiving an incoming CW signal and converting same into a potential proportional to the relative bearing thereof includes a pair of spacially disposed hydrophones, a receiver coupled to the outputs of said hydrophones, an aspect determining means connected to the output of said receiver, and an end of ping detector effectively interconnecting the aforesaid receiver and aspect determining means.

7. The device of claim 5 wherein said means effectively connected to said receiving and converting means for elongating and highlighting said received CW signal in accordance with the relative bearing and duration thereof, respectively, comprises a cathode ray tube for projecting a light beam having a sweep position corresponding to the aforesaid potential, a mask means disposed in the path of said projected light beam for filtering same and producing highlights therein in accordance with said sweep position and corresponding predetermined submarine acoustical reflection characteristics, and photomultiplier means disposed for response to said filtered light beam for effecting an electrical output signal proportional thereto.

8. The device of claim 5 characterized further by including means connected to said elongating and highlighting means and the aforesaid amplitude level regulating means for resetting same after said regulated signal has been broadcast, in preparation for receiving a new incoming CW signal.

9. A method of simulating acoustical ping echos reflected from full-sized submarine boats comprising the steps of receiving said ping at a pair of spacially disposed stations, ascertaining the difference in reception time of said ping at said stations, computing the relative bearing angle from said reception time difference, vertically positioning the light beam of a cathode ray tube in accordance with said relative bearing angel, determining the arrival of the end of the incoming ping, horizontally sweeping said light beam at said vertical position when the end of said ping arrives, modulating said light beam as necessary to produce a highlighted signal, receiving and converting said highlighted signal into a proportional electrical output signal in terms of corresponding acoustical energy.

10. A method of simulating sonar echo signals reflected from full-sized submarine boats comprising the steps of receiving an incoming CW search signal from an echo-ranging vessel, determining the relative bearing angle of of said incoming CW search signal at substantially the time same is received and simultaneously memorizing the frequency thereof, linearly elongating said CW signal in accordance with the cosine function of said relative bearing angle and a predetermined compensating exponential function combined therewith, modulating said elongated CW signal with predetermined highlight characteristics, determining the length and amplitude of said incoming CW signal as same is initially received, mixing said modulated elongated CW signal with the aforesaid memorized CW signal frequency in a ratio proportional to said incoming CW signal length, and transmitting said last mentioned mixed signals as an acoustical signal having a power corresponding to the aforesaid initially received CW signal amplitude.

11. A method of simulating sonar echo signals reflected from full-sized submarine boats comprising the steps of receiving an incoming ping from an echo-ranging vessel, determining the relative bearing angle of said vessel at the time said ping is received, elongating said ping in accordance with a predetermined linear function of said relative bearing angle, determining the length and amplitude of said incoming ping as it is initially received and memorizing the carrier wave frequency thereof, mixing said elongated ping and said memorized carrier wave frequency in a predetermined ratio proportional to said incoming ping length, and broadcasting said last mentioned mixed ping and carrier wave as an acoustical signal having a power corresponding to the aforesaid incoming ping amplitude.

* * * * *